(12) United States Patent
Cathelin et al.

(10) Patent No.: US 8,787,852 B2
(45) Date of Patent: Jul. 22, 2014

(54) RECONFIGURABLE WIDE-BAND RECEIVER WITH POSITIVE FEED-BACK TRANSLATIONAL LOOP

(75) Inventors: Philippe Cathelin, Laval (FR); Christian Izquierdo, Grenoble (FR); Franck Montaudon, Grenoble (FR); Andreas Kaiser, Villeneuve d'Ascq (FR)

(73) Assignee: ST-Ericsson SA, Plan-les-Quates, (CH)

( * ) Notice: Subject to any disclaimer, the term of this patent is extended or adjusted under 35 U.S.C. 154(b) by 0 days.

(21) Appl. No.: 13/879,720

(22) PCT Filed: Oct. 20, 2011

(86) PCT No.: PCT/EP2011/068361
§ 371 (c)(1),
(2), (4) Date: Jul. 16, 2013

(87) PCT Pub. No.: WO2012/052520
PCT Pub. Date: Apr. 26, 2012

(65) Prior Publication Data
US 2013/0281039 A1    Oct. 24, 2013

(30) Foreign Application Priority Data

Oct. 22, 2010  (EP) ..................................... 10306158
Dec. 10, 2010  (EP) ..................................... 10194629

(51) Int. Cl.
*H04B 1/04*    (2006.01)

(52) U.S. Cl.
USPC .......... 455/130; 455/73; 455/168.1; 455/303; 455/307

(58) Field of Classification Search
CPC ......... H04B 1/16; H04B 1/10053; H04B 1/40
USPC ............. 455/73, 130, 168.1, 248.1, 306, 307, 455/303, 341
See application file for complete search history.

(56) References Cited

U.S. PATENT DOCUMENTS

| 4,718,113 A | 1/1988 | Rother et al. |
| 5,822,704 A * | 10/1998 | Ishii ........................... 455/553.1 |

(Continued)

OTHER PUBLICATIONS

Bagheri, R., et al., "An 800MHz to 5GHz Software-Defined Radio Receiver in 90nm CMOS", IEEE International Solid-State Circuits Conference, Digest of Technical Papers, Session 26, Cellular Building Blocks and Socs, Feb. 6, 2006, pp. 1932-1941, IEEE, San Francisco, CA, US.

(Continued)

*Primary Examiner* — Tuan Pham
(74) *Attorney, Agent, or Firm* — Coats & Bennett, P.L.L.C.

(57) ABSTRACT

The invention relates to a device comprising a direct path block with an input and an output, and a feedback block with an input and an output, the input of the direct path block being adapted to receive a multi-channel input signal with a given frequency range and the output of the direct path block being adapted to output an output signal with a base band frequency range, the output of the direct path block being coupled to the input of the feedback block and the input of the direct path block being coupled to the output of the feedback block. The direct path block comprises a first transposing unit (4) adapted to transpose the input signal to the base band frequency range and the feedback block comprises a filtering unit (3) adapted to filter the transposed signal at the output of the direct path block, a second transposing unit (5) adapted to transpose the filtered signal to the given frequency range and to feed back the transposed signal at the input of the direct path block. The first transposing unit and the second transposing unit are reconfigurable in function of the given frequency range of the input signal.

10 Claims, 3 Drawing Sheets

(56) References Cited

U.S. PATENT DOCUMENTS

| | | | |
|---|---|---|---|
| 5,950,119 A * | 9/1999 | McGeehan et al. | 455/302 |
| 5,982,807 A * | 11/1999 | Snell | 375/146 |
| 6,778,594 B1 * | 8/2004 | Liu | 375/222 |
| 2006/0208791 A1 | 9/2006 | Vilhonen | |
| 2008/0224763 A1 | 9/2008 | Vilhonen | |
| 2009/0156152 A1 | 6/2009 | Sahota et al. | |
| 2012/0171980 A1 | 7/2012 | Sivonen et al. | |

OTHER PUBLICATIONS

Mizraei, A., et al., "A Low-Power WCDMA Transmitter With an Integrated Notch Filter", IEEE Journal of Solid-State Circuits, Dec. 1, 2008, pp. 2868-2881, vol. 43, Issue: 12, IEEE Solid-State Circuits Society.

Werth, T., et al., "Active Feedback Interference Cancellation in RF Receiver Front-Ends", IEEE Radio Frequency Integrated Circuits Symposium, Boston, MA, Jun. 7, 2009, pp. 379-382, IEEE.

Izquierdo, C., et al., "Reconfigurable Wide-band Receiver with Positive Feed-back Translational Loop", IEEE Radio Frequency Integrated Circuits Symposium (RFIC), Baltimore, MD, Jun. 5, 2011, pp. 1-4, IEEE.

Izquierdo, C. et al., "Wide-Band Receiver Architecture With Flexible Blocker Filtering Techniques", Conference publication, 17th IEEE International Conference on Electronics, Circuits, and Systems (ICECS), Dec. 12, 2010, pp. 894-897, IEEE.

Darabi, H., "A Blocker Filtering Technique for SAW-Less Wireless Receivers", IEEE Journal of Solid-State Circuits, Dec. 1, 2007, pp. 2766-2773, vol. 42, Issue 12, IEEE.

Werth, T. et al., "An Active Feedback Interference Cancellation Technique for Blocker Filtering in RF Receiver Front-Ends", IEEE Journal of Solid-State Circuits, May 1, 2010, pp. 989-997, vol. 45, Issue 5, IEEE.

Keehr, E. et al., "Equalization of IM3 Products in Wideband Direct—Conversion Receivers", IEEE International Solid-State Circuits Conference, Digest of Technical Papers, Feb. 5, 2008, pp. 204-205, 607, IEEE.

Safarian, A. et al., "Integrated Blocker Filtering RF Front Ends", Conference publication, 2007 IEEE Radio Frequency Integrated Circuits (RFIC) Symposium, Jun. 3, 2007, pp. 13-16, IEEE.

He, X. et al., "A Compact SAW-less Multiband WCDMA/GPS Receiver Front-End with Translational Loop for Input Matching", Conference publication, 2011 IEEE International Solid-State Circuits Conference Digest of Technical Papers (ISSCC), Feb. 20, 2011, pp. 372-374, IEEE.

\* cited by examiner

RECONFIGURABLE WIDE-BAND RECEIVER WITH POSITIVE FEED-BACK TRANSLATIONAL LOOP

BACKGROUND OF THE INVENTION

1. Technical Field

The present invention generally relates to signal processing for the reception of radio signals, especially by wide-band receivers.

It finds applications, in particular, in radio-frequency receiver, e.g., Software Defined Radio receiver, in cellular phones and other mobile communication devices.

2. Related Art

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Software Defined Radio (SDR) aims the capability of supporting multiple radio standards and bands. For example, SDR are adapted to receive radio frequency signals in a plurality of frequency ranges. To this end, they are usually built with a wide-band Low Noise Amplifier (LNA) followed by a configurable base-band filter, and an analogical-to-digital converter. Nevertheless, constraints are very high and Surface Acoustic Wave (SAW) filters are usually inserted between the antenna input and the receiver input to attenuate interferers in the received signal.

However, using SAW filters cancels all benefits of a wide-band receiver design. Indeed, the LNA can no longer be shared among different frequency ranges because of the SAW filter included between the LNA and the antenna, which filters the received signal in a unique narrow band and which is not reconfigurable. To obtain a wide-band receiver, it is then necessary to have such a receiver, or at least a part of it, for each of the radio frequency ranges, instead of having a unique receiver for a plurality of frequency ranges. Furthermore, SAW filters add extra components, board area and degrade the receiver sensitivity by 2 to 3 dB.

SUMMARY OF THE INVENTION

To address these needs, a first aspect of the present invention relates to a device comprising a direct path block with an input and an output, and a feedback block with an input and an output, the input of the direct block path being adapted to receive a multi-channel input signal with a given frequency range and the output of the direct block path being adapted to output an output signal with a base band frequency range, the output of the direct path block being coupled to the input of the feedback block and the input of the direct path block being coupled to the output of the feedback block, wherein:

the direct path block comprises a first transposing unit adapted to transpose the input signal to the base band frequency range, the feedback block comprises a filtering unit adapted to filter the transposed signal at the output of the direct path block, a second transposing unit adapted to transpose the filtered signal to the given frequency range and to feed back the transposed signal at the input of the direct path block, and the first transposing unit and the second transposing unit are reconfigurable in function of the given frequency range of the input signal.

In one embodiment of the invention, the first transposing unit and the second transposing unit comprise a first mixer and a second mixer, respectively, and a common oscillator coupled to the first mixer and to the second mixer.

In another embodiment of the invention, the oscillator delivers a signal at a frequency, which depends dynamically on the given frequency range of the input signal.

In another embodiment of the invention, the direct path block further comprises an amplifying unit adapted to amplify the input signal at the input of the direct path block.

In still another embodiment of the invention, the filtering unit is a low-pass filter and the transposed signal is positively fed back at the input of the direct path block.

In still another embodiment of the invention, the feedback block further comprises a feedback amplifier adapted to amplify the transposed signal and to feed back the amplified signal at the input of the direct path block.

In another embodiment of the invention, parameters of the feedback block can also be configured so that an input impedance defined by the ratio of a voltage at the input of the device on an input current at the input of the device is set to given value.

In another embodiment of the invention, the device is a wide band receiver.

Another objet of the invention relates to a method being implemented by a device comprising a direct path block with an input and an output, and a feedback block with an input and an output, being adapted to receive a multi-channel input signal with a given frequency range and being adapted to output an output signal with a base band frequency range, the output of the direct path block being coupled to the input of the feedback block and the input of the direct path block being coupled to the output of the feedback block, the method comprising:

receiving an input signal with a given frequency range at the input of the direct path block;

transposing the input signal to the base band frequency range at the input of the feedback block;

filtering the transposed signal;

transposing the filtered signal to the given radio frequency range; and feeding back the transposed signal at the input of the direct path block;

the transposing of the input signal to the base band frequency and the transposing of the filtered signal to the radio frequency range being function of the frequency range of the input signal.

In one embodiment, the filtering of the transposed signal is a low-pass filtering and the feeding back is positive.

In complement, parameters of the feedback block can be configured so that an input impedance defined by the ratio of a voltage at the input of the device on an input current at the input of the device, is set to a given value.

Still another object of the invention concerns a system comprising a device according to one embodiment of the invention, a receiving unit adapted to receive an input signal with a given frequency range and adapted to provide the device with the input signal, and an output filtering unit adapted to filter the output signal at the output of the device.

BRIEF DESCRIPTION OF THE DRAWINGS

The present invention is illustrated by way of example, and not by way of limitation, in the figures of the accompanying drawings, in which like reference numerals refer to similar elements and in which.

DESCRIPTION OF PREFERRED EMBODIMENTS

Figure 1:
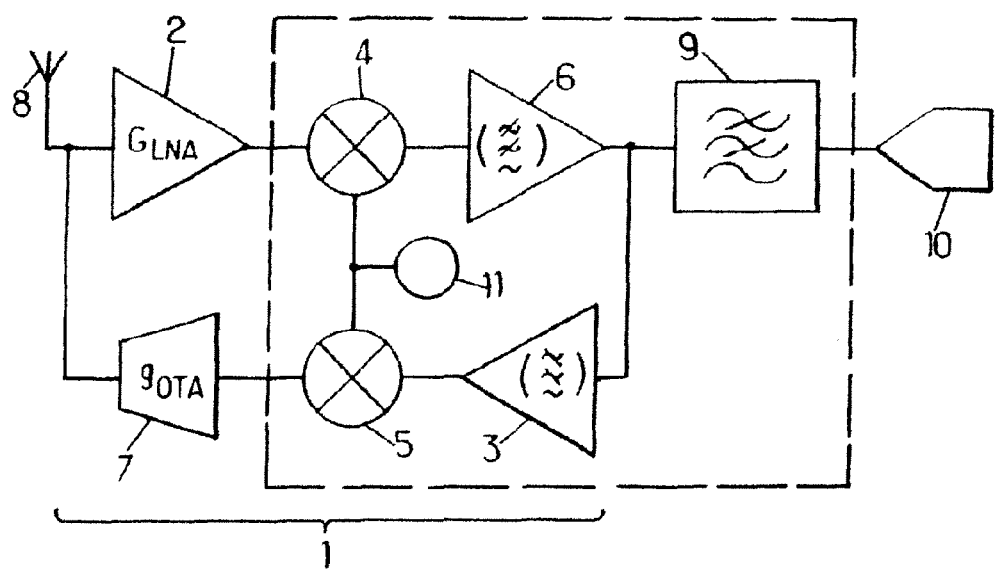
FIG. 1 represents a device according to one embodiment of the invention.

Referring to FIG. 1, there is shown therein a device 1 according to an embodiment of the present invention. The device 1 represented here can be a receiver that comprises, in one embodiment, a direct path block with an input being coupled to an input of the receiver 1, and an output coupled to an output of the receiver 1, comprising a first amplifier 2, a mixer 4 and a second amplifier 6, and a feedback block, with an input and an output, comprising a feedback filter 3, a feedback mixer 5 and a feedback amplifier 7. The output of the direct path block can be coupled to the input of the feedback block and the input of the direct path block can be coupled to the output of the feedback block. Receiver 1 input can be coupled to an antenna 8 adapted to receive and deliver to receiver 1 radio frequency signals with a given frequency range among a plurality of frequency ranges. Receiver 1 can be adapted to provide an output signal filtered and transposed to a base band frequency range to be further filtered by a filter 9 and transmitted to an analogical-to-digital converter 10 in order to be digitally processed by a system comprising the receiver 1 for example.

No restriction can be attached to the types of amplifiers, mixers or filters that are comprised in receiver 1. In one embodiment of the invention, first amplifier 2 is a Low Noise Amplifier adapted to amplify the input signal that is received from the antenna 8.

Amplifier 2 can be adapted to receive an input signal obtained on the basis of a signal provided by the antenna 8 and a signal provided by the feedback amplifier 7. In the example represented on FIG. 2, both signals can be summed or subtracted to obtain input signal of amplifier 2. Low Noise Amplifier 2 can also be configured to provide an amplified signal that is transmitted to the mixer 4. In one embodiment, first mixer 4 is adapted to receive the amplified signal from amplifier 2 and a signal with frequency $f_{LO}$, which is provided by a common oscillator 11. The frequency of the signal delivered by the common oscillator 11 can be configurable and thus adapted to the frequency range of the input signal. For example, a table can associate a frequency $f_{LO}$ to each of the frequency ranges that can be received by receiver 1 and can be used to adapt frequency $f_{LO}$ to the received signal. In one embodiment, the mixer 4 is adapted to generate a mixed signal obtained by translating the amplified signal around frequency $f_{LO}$, in a base band frequency range (lower frequencies) in order to be further processed. Thus, the receiver is adapted to process signals with a plurality of frequency ranges insofar as the common oscillator 11 can be configurable to transpose the received signal to the base band frequency range.

The mixed signal can then be transmitted to the second amplifier 6. Second amplifier 6 is configured to output a second amplified signal, where the part of the signal in the base band frequencies is amplified, in order to be transmitted to the filter 9 and to an input of the feedback filter 3. Feedback filter 3 is adapted to output a filtered signal based on the received amplified signal and to transmit the filtered signal to the feedback mixer 5. Depending on the nature of the feedback, respectively positive or negative, feedback filter 3 can be a low-pass filter or a high-pass filter. Feedback mixer 5 can be configured to receive the filtered signal and also a signal outputted an oscillator. On the example represented here, the common oscillator 11 outputs signals with frequency $f_{LO}$ to be mixed by both mixer 4 and feedback mixer 5. Feedback mixer 4 is configured to output a second mixed signal based on the filtered signal and the signal with frequency $f_{LO}$, which enables to transpose the base band signal to the same frequency range as the given frequency range of the input signal outputted by antenna 8 for example. The mixed signal is transmitted to the feedback amplifier 7, which can be for example a trans-conductance amplifier adapted to output a signal which is added or subtracted to the signal provided by antenna 8 and transmitted to the first amplifier 2.

Figure 2:
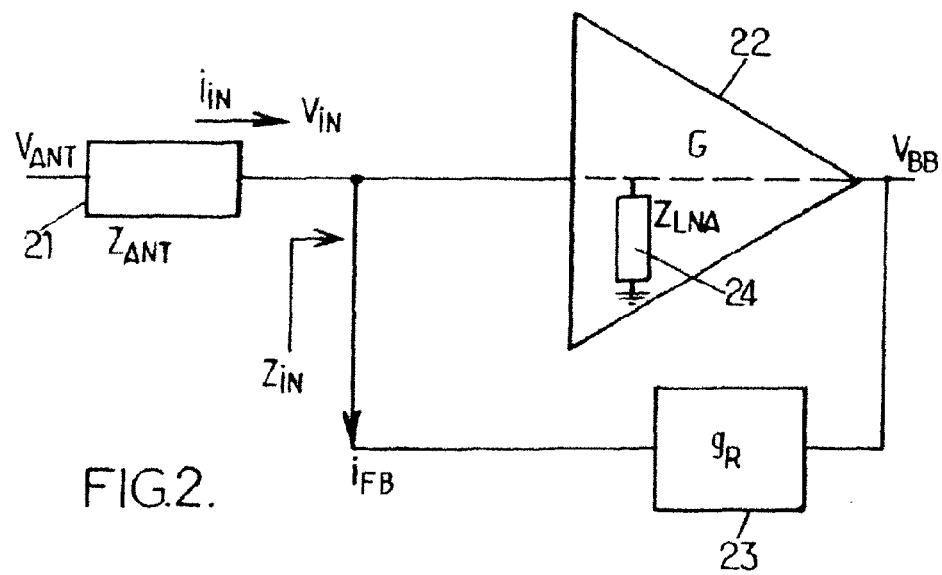
FIG. 2 is a simplified view of the device represented on FIG. 1.

The operation of receiver 1 will be better understood in view of FIG. 2 representing a simplified view of the receiver 1 according to one embodiment of the invention.

Receiver 1 is modelled by a circuit 20. Amplifier 2 input impedance is represented in this embodiment by a component 24 of impedance $Z_{LNA}$ and coupled to the ground.

Antenna 8 is modelled by a voltage source 21 with series impedance $Z_{ANT}$ being a ratio of a voltage $V_{ant}$, between voltage source 21 input and the ground, on an intensity $i_{in}$ running through the voltage source 21.

The direct path block of receiver 1 can be represented by a transfer filter 22 with a voltage gain G that can be obtained by:

$$G = \frac{V_{BB}}{V_{IN}} = G_{LNA} * Gmix * Gamp$$

where $V_{BB}$ is the voltage between the output of the direct path block and the ground, $G_{LNA}$ is the voltage gain of the first amplifier 2, $G_{mix}$ is the voltage gain of the mixer 4, and $G_{amp}$ is the voltage gain of the second amplifier 6.

Feedback block is modelled by a component 23, with transconductance being defined by:

$$g_R(f) = \frac{i_{FB}}{V_{BB}} = Gfil(f - f_{LO}) * Gmix * g_{OTA}$$

where $i_{FB}$ is the current running through the component 23, $V_{BB}$ is the voltage between the output of the direct path block and the ground, $G_{fil}$ is the voltage gain of the feedback filter 3, which depends on the frequency of the signal received from the second amplifier 6, $G_{mix}$ is the voltage gain of the feedback mixer 6, which, in this example, equals the voltage gain of the mixer 4.

$g_{OTA}$ is the trans-conductance of feedback amplifier 7, which is defined by the ratio of the intensity $i_{FB}$ on the voltage across the feedback amplifier 7.

Both the path through the direct path block and the path through the feedback block go through a mixer stage (respectively implemented by mixer 4 and by feedback mixer 5) with identical frequency $f_{LO}$. In practice, the common mixer stage can be implemented as quadrature direct conversion architecture.

The feedback block represented by component 23 can add impedance $Z_{FB}$ in parallel to the impedance $Z_{LNA}$ of component 24, impedance $Z_{FB}$ being given by:

$$Z_{FB}(f) = \frac{V_{IN}}{i_{FB}}$$
$$= \frac{1}{G_{LNA} * Gmix^2 * Gamp * Gfil(f - f_{LO}) * g_{OTA}}$$
$$= \frac{K}{Gfil(f - f_{LO})}$$

where $$K = \frac{1}{G_{LNA} * (Gmix)^2 * Gamp * g_{OTA}}$$

Then, input impedance, being defined by the ratio of voltage input $V_{in}$ on the input intensity $i_{in}$, depending on the frequency, is given by:

$$Z_{IN}(f) = \frac{Z_{FB}(f) Z_{LNA}}{Z_{FB}(f) + Z_{LNA}}$$

Amplifier 2 being defined, and thus impedance $Z_{LNA}$ being fixed, receiver 1 can be designed in such a way that input impedance $Z_{IN}$ matches antenna impedance $Z_{ANT}$ only in the frequency band of a desired channel, that is, in the frequency range of the input signal received from antenna 8. Signals that are out of the given frequency range or desired range, also called out-of-band signals, are then filtered on the input of the amplifier 2 due to the impedance mismatch.

In a first configuration of the receiver 1, the amplified signal provided by feedback amplifier 7 is subtracted from the signal provided by antenna 8, to cancel signals that are out of the frequency range of the given signal. Different results can be obtained, depending on the type of feedback filter 3 that is used.

In a first example, feedback filter 3 is a first order low-pass filter implemented for example with a resistor of value R and a capacitor of capacitance C, defined by a function $L_{LP}(f)$, and a function $L_{BP}(f)$ which is the mathematical expression of a first order low-pass filter translated around $F_{LO}$:

$$L_{LP}(f) = \frac{1}{1 + j\frac{f}{fc}} \Rightarrow L_{BP}(f - f_{LO})$$

$$= \frac{\left(1 + j\frac{f}{fc}\right)}{\left(1 + j\frac{f}{fc}\right)^2 + \left(\frac{f_{LO}}{fc}\right)^2}$$

where $$fc = \frac{1}{2\pi RC}$$

is the cut off frequency of the filter.

By replacing this expression in the expression of the feedback impedance $Z_{FB1}(f)$, the following result is obtained:

$$Z_{FB1}(f) = \frac{K}{L_{BP}(f - f_{LO})}$$

Thus, the input impedance $Z_{IN1}(f)$ can be expressed by:

$$Z_{IN1}(f) = \frac{Z_{LNA}}{1 + \frac{Z_{LNA} * L_{BP}(f - f_{LO})}{K}}$$

Considering now a second example where feedback filter 3 is a first order high pass filter implemented, for example, with a resistor of value R and a capacitor of capacitance C defined by a function $H_{HP}(f)$ and a function $H_{BP}(f)$ which is the mathematical expression of a first order high-pass filter translated around $F_{LO}$:

$$H_{HP}(f) = \frac{j\frac{f}{fc}}{1 + j\frac{f}{fc}} \Rightarrow H_{BP}(f - F_{LO})$$

$$= \frac{j\frac{f}{fc}\left(1 + j\frac{f}{fc}\right) + \left(\frac{f_{LO}}{fc}\right)^2}{\left(1 + j\frac{f}{fc}\right)^2 + \left(\frac{f_{LO}}{fc}\right)^2}$$

where $$fc = \frac{1}{2\pi RC}$$

is the cut-off frequency of the filter.

By replacing this expression successively in the expression of the feedback impedance and of the input impedance $Z_{IN2}(f)$, the following result is obtained:

$$Z_{IN2}(f) = \frac{Z_{LNA}}{1 + \frac{Z_{LNA} * H_{BP}(f - f_{LO})}{K}}$$

Figure 3:
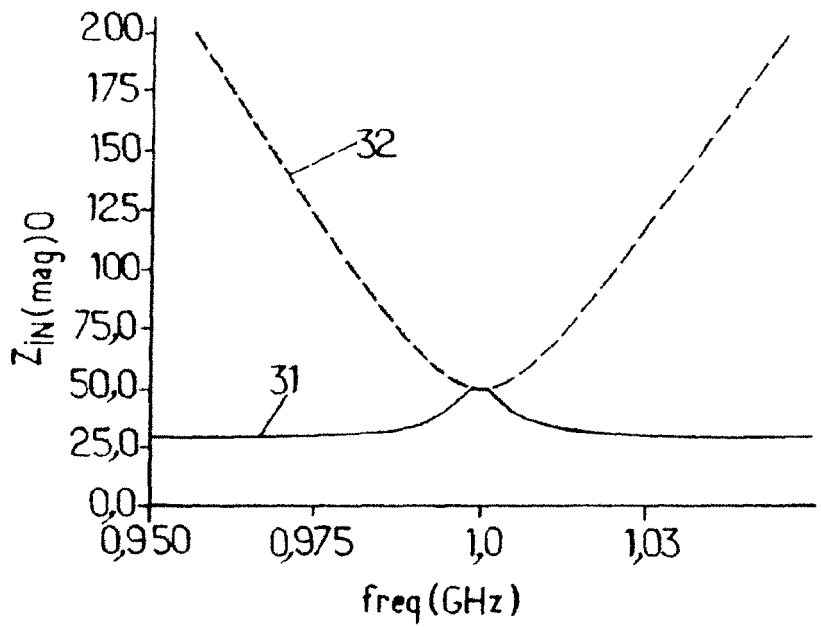
FIG. 3 is a graph illustrating simulated input impedance in a device according to one embodiment of the invention, versus frequency.

Referring to FIG. 3, there is shown a graph illustrating simulated input impedance in the receiver 1 for a low-pass filter and a high-pass filter according to the examples previously introduced, versus frequency. In this example, parameters of the feedback block are set to achieve a matching between input impedance $Z_{IN}$ and antenna impedance $Z_{ANT}$ only in a selective band around frequency $f_{LO}$, depending on the following data:

$Z_{ANT}$=50Ω, $Z_{LNA}$=1KΩ, $f_c$=8.8 MHz and $f_{LO}$=1 GHz

A first curve 31 represents the result of a simulation for a first order high-pass filter, with K=150Ω. A second curve 32 represents the result of a simulation for a first order low-pass filter with K=85Ω. A matching between input impedances $Z_{IN2}$ and $Z_{IN1}$ and antenna impedance $Z_{ANT}$ is made in both cases in a band around frequency $f_{LO}$. On second curve 32, input impedance $Z_{IN1}$ increases when frequency moves away from $f_{LO}$, thus enabling to reduce the gain for out-of-band signals. On first curve 31, input impedance $Z_{IN2}$ decreases when frequency moves away from $f_{LO}$.

In a second configuration of the receiver 1, the amplified signal provided by feedback amplifier 7 is added to the signal provided by antenna 8.

In this embodiment, feedback filter 3 is a first order low-pass filter implemented for example with a resistor of value R and a capacitor of capacitance C, defined by a function $L_{LP}(f)$, and a function $L_{BP}(f)$ which is the mathematical expression of a first order low-pass filter translated around $F_{LO}$:

$$L_{LP}(f) = \frac{1}{1 + j\frac{f}{fc}} \Rightarrow L_{BP}(f - f_{LO})$$

$$= \frac{\left(1 + j\frac{f}{fc}\right)}{\left(1 + j\frac{f}{fc}\right)^2 + \left(\frac{f_{LO}}{fc}\right)^2}$$

where $$fc = \frac{1}{2\pi RC}$$

is the cut-off frequency of the filter.

By replacing this expression in the expression of the feedback impedance $Z_{FB3}(f)$ for a positive feedback changing the sign of current $i_{FB}$, the following result is obtained:

$$Z_{FB3}(f) = \frac{Vin}{-i_{FB}} = \frac{-K}{Gfil(f - f_{LO})}$$

Thus, the input impedance $Z_{IN3}(f)$ can be expressed by:

$$Z_{IN3}(f) = \frac{Z_{LNA}}{1 - \frac{Z_{LNA} * L_{BP}(f - f_{LO})}{K}}$$

Impedance $Z_{LNA}$ can be chosen smaller than $Z_{ANT}$ to reject out-of-band signals. By increasing the difference between these impedances, the attenuation of the out-of-band signals is improved.

Figure 4:
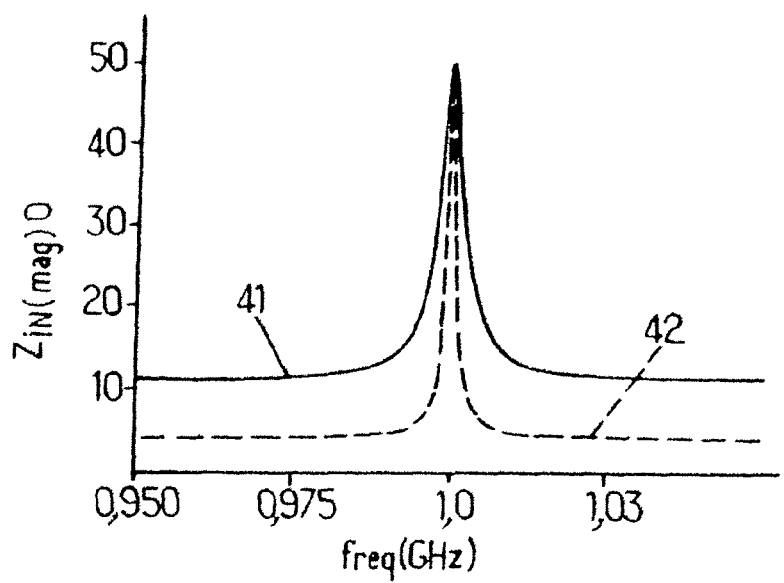
FIG. 4 is a graph showing simulated input impedance of a device according to one embodiment of the invention, versus frequency.
Figure 5:
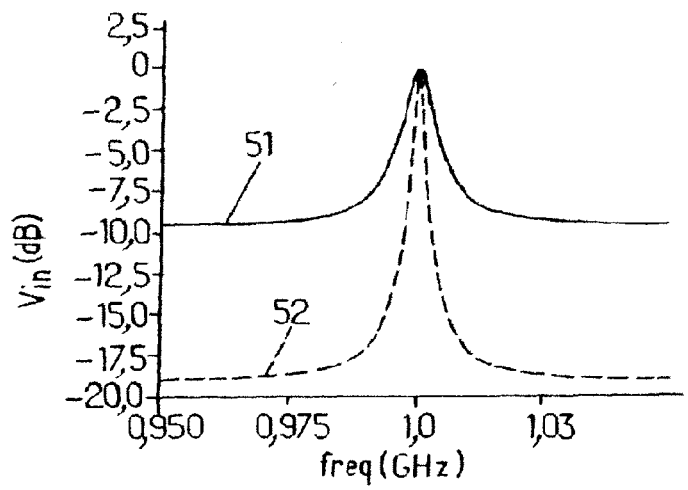
FIG. 5 a graph showing simulated attenuation in decibels of input voltage in a device according to one embodiment of the invention, versus frequency.

Referring now to FIG. 4 and FIG. 5, the simulated results for a first order low-pass filter in the case of a positive feedback are considered. The following parameters are considered in this example:

$Z_{ANT}$=50Ω, $f_c$=8.8 MHz and $f_{LO}$=1 GHz

FIG. 4 is a graph showing simulated input impedance versus frequency for a first order low-pass filter in receiver 1 for positive feedback represented by a third curve 41 with K=12.4Ω and $Z_{LNA}$=10Ω and for a first order low-pass filter represented by fourth curve 42 with K=3.2Ω and $Z_{LNA}$=3Ω. FIG. 5 is a graph showing simulated attenuation in decibels (dB) of input voltage for a first order low-pass filter in receiver 1 with positive feedback represented by a fifth curve 51 with K=12.4Ω and $Z_{LNA}$=10Ω and for a first order low-pass filter represented by sixth curve 52 with K=3.2Ω and $Z_{LNA}$=3Ω, versus frequency.

A matching between input impedance $Z_{IN3}$ and antenna impedance $Z_{ANT}$ is obtained for a feedback low-pass filter in a narrow band around $f_{LO}$:

$$Z_{IN3}(f_{LO}) = \frac{Z_{LNA}}{1 - \frac{Z_{LNA}}{K}} = Z_{ANT}$$

Consequently, receiver 1 attenuates the signals that are out of the given frequency range of the input signal (also called out-of-band signals). The attenuation can depend on the initial value of impedance $Z_{LNA}$ and can be given by:

$$AT(dB) = -20\log\left(\frac{Z_{IN3}(f_{LO})}{Z_{ANT} + Z_{IN3}(f_{LO})} * \frac{Z_{ANT} + Z_{LNA}}{Z_{LNA}}\right)$$

where AT is the attenuation expressed in decibels (dB).

Referring to FIG. 5, in the case of a low-pass filter illustrated on sixth curve 52, the attenuation obtained is around 19 dB.

The advantage of the positive feedback is the attenuation of every signals by default if impedance $Z_{LNA}$ is smaller than impedance $Z_{ANT}$. The positive feedback allows matching the device with the antenna impedance $Z_{ANT}$ only in the band defined by the low-pass filter of the feedback block. Then, bandwidth loop does not limit the performance of the system because the impedance is only modified for frequency around the signal and the out-of-band signals are filtered as the loop does not work for higher frequency. In the case of negative feedback (HP Filter), feedback block must work at higher frequency than all out-of-band interferers.

The stability of the receiver 1 can be studied by analyzing loop gain expression S(f) in open-loop given by:

$$S(f) = \frac{Z_{ANT} Z_{LNA}}{(Z_{ANT} + Z_{LNA})} * \frac{L_{BP}(f - f_{LO})}{K}$$

A stability condition can be given by:

$$-\frac{\frac{Z_{ANT} Z_{LNA}}{(Z_{ANT} + Z_{LNA})}}{K} > -1$$

for $f = f_{LO}$.

The stability of such architecture of receiver 1 depends on the value of K.

Figure 6:
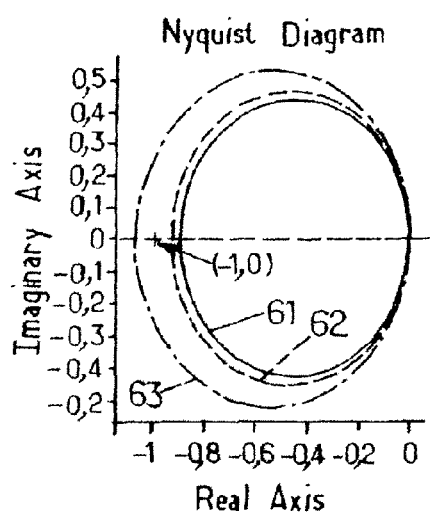
FIG. 6 is a Nyquist diagram of loop gain expression for a device according to one embodiment of the invention.

Referring now to FIG. 6, a Nyquist diagram of loop gain expression S(f) for receiver 1 with positive feedback is represented with a first circle 61, a second circle 62 and a third circle 63, respectively for three different values of K, namely K1=3.2Ω, K2=3.09Ω and K3=Ω, and with $Z_{LNA}$=3Ω and $Z_{ANT}$=50Ω.

If a circle encloses the point defined by coordinates (−1,0), the architecture is unstable. Thus, for the value K3 corresponding to third circle 63, the system is unstable. For the two other values of K1 and K2, corresponding to the first and the second circles 61 and 62, the architecture is unconditionally stable. Parameters of receiver 1, and in particular of feedback block, as trans-conductance value $g_r$ for example, can be determined so that architecture of receiver 1 is unconditionally stable.

Figure 7:
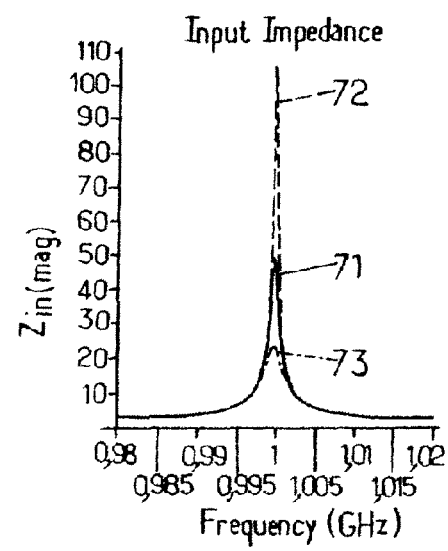
FIG. 7 a diagram representing input impedances for different parameters of a device according to one embodiment of the invention, versus frequency.

Referring now to FIG. 7, a diagram representing input impedance versus frequency for the different values K1, K2 and K3, respectively represented by seventh curve 71, eighth curve 72 and ninth curve 73, for receiver 1 with positive feedback, can be considered. In the case of K2, for which the architecture of receiver 1 is stable, a strong output signal is fed to the input of receiver 1. Impedance $Z_{IN}$ becomes larger than $Z_{ANT}$ and the impedance matching of the device is not achieved. Parameters of receiver 1 and in particular of feedback block, can be determined so that input impedance $Z_{IN}$ is set to impedance value $Z_{ANT}$. Thus, positive feedback in a receiver according to the invention enables to improve radio frequency filtering attenuation and selectivity for out-of-band signals, when parameters of the feedback block are adjusted depending on the initial value of impedance $Z_{LNA}$, which is constrained by Low Noise Amplifier 2 design trade off, and on stability considerations. The attenuation depends on the value between impedance $Z_{ANT}$ and $Z_{LNA}$. To improve the attenuation of the out-of-band signals the $Z_{LNA}$ should be lower as possible. Selectivity can depend on the cut-off frequency $f_c$, which can be, joined with frequency $f_{LO}$, configurable for multi-standard and multi-band applications. With realistic values for the various parameters, an attenuation of out-of-band signals of up to −19 dB can be obtained.

Figure 8:
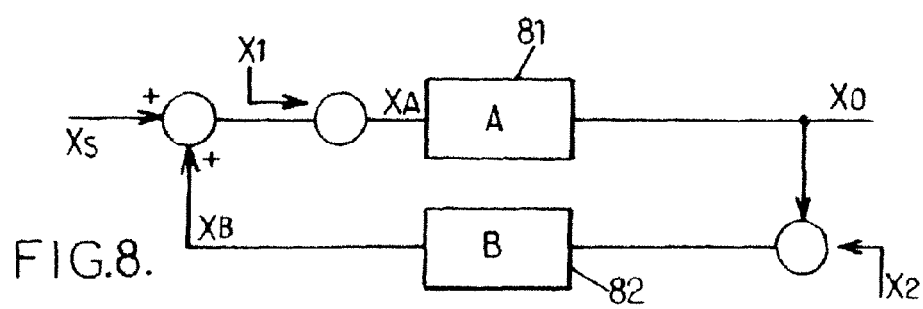
FIG. 8 is a model representing different noise sources in a device according to one embodiment of the invention.

Referring to FIG. 8, receiver 1 with positive feedback is modelled to illustrate the different sources of noise, respectively input noise $X_s$, direct path noise $X_1$ at the input of direct path block 81, feedback noise $X_2$ at the input of feedback block 81, and output noise $X_0$ at the output of receiver 1.

Considering voltage noise sources in a band of 1 Hz, the output noise is given by:

$$X_0^2 = \left(\frac{A}{1-AB}\right)^2 Xs^2 + \left(\frac{A}{1-AB}\right)^2 X_1^2 + \left(\frac{AB}{1-AB}\right)^2 X_2^2$$

with A being the voltage gain associated to direct path block 81, and

B being the voltage gain associated to feedback block 82.

Then, noise figure $F_{FB}$ in feedback block 82 can be defined according to North definition by:

$$F_{FB} = 1 + \frac{X_1^2}{Xs^2} + B^2 \frac{X_2^2}{Xs^2} = F_A + B^2(F_B - 1)$$

Such analysis shows the variation of noise figure in receiver 1 with positive feedback. Feedback block 82 increases the noise in the given frequency range of the received signal (in-band) due to noisy output signal brought to the input of receiver 1. In a real application, gain A can be large. Then, gain B will be chosen small, preferably smaller than 1, to decrease the noise and ensure stability. Thus, the dominant noise contributor will be the direct path block 81, and in particular Low Noise Amplifier 2 and noise impact of the invention can be made small. Thus, the global noise of the system can be assimilated to the direct path noise $X_1$.

The present invention can also be embedded in a computer program product, which comprises all the features enabling the implementation of the methods described herein, and which, when loaded in an information processing system, causes the information processing system. Computer program means or computer program in the present context mean any expression, in any language, code or notation, of a set of instructions intended to cause a system having an information processing capability to perform a particular function either directly or after either or both of the following a) conversion to another language. Such a computer program can be stored on a computer or machine readable medium allowing data, instructions, messages or message packets, and other machine readable information to be read from the medium. The computer or machine readable medium may include non-volatile memory, such as ROM, Flash memory, Disk drive memory, CD-ROM, and other permanent storage. Additionally, a computer or machine readable medium may include, for example, volatile storage such as RAM, buffers, cache memory, and network circuits. Furthermore, the computer or machine readable medium may comprise computer or machine readable information in a transitory state medium such as a network link and/or a network interface, including a wired network or a wireless network, that allow a device to read such computer or machine readable information.

Expressions such as "comprise", "include", "incorporate", "contain", "is" and "have" are to be construed in a non-exclusive manner when interpreting the description and its associated claims, namely construed to allow for other items or components which are not explicitly defined also to be present. Reference to the singular is also to be construed in be a reference to the plural and vice versa.

While there has been illustrated and described what are presently considered to be the preferred embodiments of the present invention, it will be understood by those skilled in the art that various other modifications may be made, and equivalents may be substituted, without departing from the true scope of the present invention. Additionally, many modifications may be made to adapt a particular situation to the teachings of the present invention without departing from the central inventive concept described herein. Furthermore, an embodiment of the present invention may not include all of the features described above. Therefore, it is intended that the present invention not be limited to the particular embodiments disclosed, but that the invention include all embodiments falling within the scope of the invention as broadly defined above.

A person skilled in the art will readily appreciate that various parameters disclosed in the description may be modified and that various embodiments disclosed and/or claimed may be combined without departing from the scope of the invention.

The invention claimed is:

1. A device comprising:
    a direct path block with an input and an output; and
    a feedback block with an input and an output;
    wherein the input of the direct path block is configured to receive a multi-channel input signal having a given frequency range;
    wherein the output of the direct path block is configured to output an output signal having a baseband frequency range;
    wherein the output of the direct path block is coupled to the input of the feedback block and the input of the direct path block is coupled to the output of the feedback block;
    wherein the direct path block comprises a first transposing unit configured to transpose the input signal to the baseband frequency range;
    wherein the feedback block comprises:
        a filtering unit configured to filter the transposed signal at the output of the direct path block; and a second transposing unit configured to transpose the filtered signal to the given frequency range and to feed back the transposed signal at the input of the direct path block;

wherein the filtering unit is a low-pass filter and the transposed signal is positively fed back at the input of the direct path block; and wherein the first transposing unit and the second transposing unit are reconfigurable as a function of the given frequency range of the input signal.

2. The device of claim 1:

wherein the first transposing unit comprises a first mixer;

wherein the second transposing unit comprises a second mixer; and wherein a common oscillator is coupled to the first mixer and to the second mixer.

3. The device of claim 2, wherein the oscillator is configured to deliver a signal at a frequency which depends dynamically on the given frequency range of the input signal.

4. The device of claim 1, wherein the direct path block further comprises an amplifying unit configured to amplify the input signal at the input of the direct path block.

5. The device of claim 1, wherein the feedback block further comprises a feedback amplifier configured to amplify the transposed signal and to feed back the amplified signal at the input of the direct path block.

6. The device of claim 1, wherein parameters of the feedback block are configured so that an input impedance defined by a ratio of a voltage at the input of the device on an input current at the input of the device is set to a given value.

7. The device of claim 1, wherein the device is a wideband receiver.

8. A method being implemented by a device comprising a direct path block having an input and an output, and a feedback block having an input and an output, being configured to receive a multi-channel input signal having a given frequency range and to output an output signal having a baseband frequency range, the output of the direct path block being coupled to the input of the feedback block and the input of the direct path block being coupled to the output of the feedback block, the method comprising:

receiving a multi-channel input signal having the given frequency range at the input of the direct path block;

transposing the input signal to the baseband frequency range at the input of the feedback block;

filtering the transposed signal;

transposing the filtered signal to the given radio frequency range; and feeding back the transposed signal at the input of the direct path block;

wherein the transposing of the input signal to the baseband frequency and the transposing of the filtered signal to the given radio frequency range are performed as a function of the given frequency range of the input signal; and wherein the filtering of the transposed signal is a low-pass filtering and the feeding back is positive.

9. The method according to claim 8, wherein parameters of the feedback block are configured so that an input impedance defined by a ratio of a voltage at the input of the device on an input current at the input of the device is set to a given value.

10. The device of claim 1:

wherein the device is configured to receive the multi-channel input signal from a receiving unit; and wherein device is configured to provide the output of the direct path block to an output filtering unit for filtering of the output signal at the output of the device.

* * * * *